Jan. 22, 1929.
W. G. CRIST
1,700,028
AUTOMOBILE HEADLAMP MOUNTING
Filed June 4, 1927
3 Sheets-Sheet 1
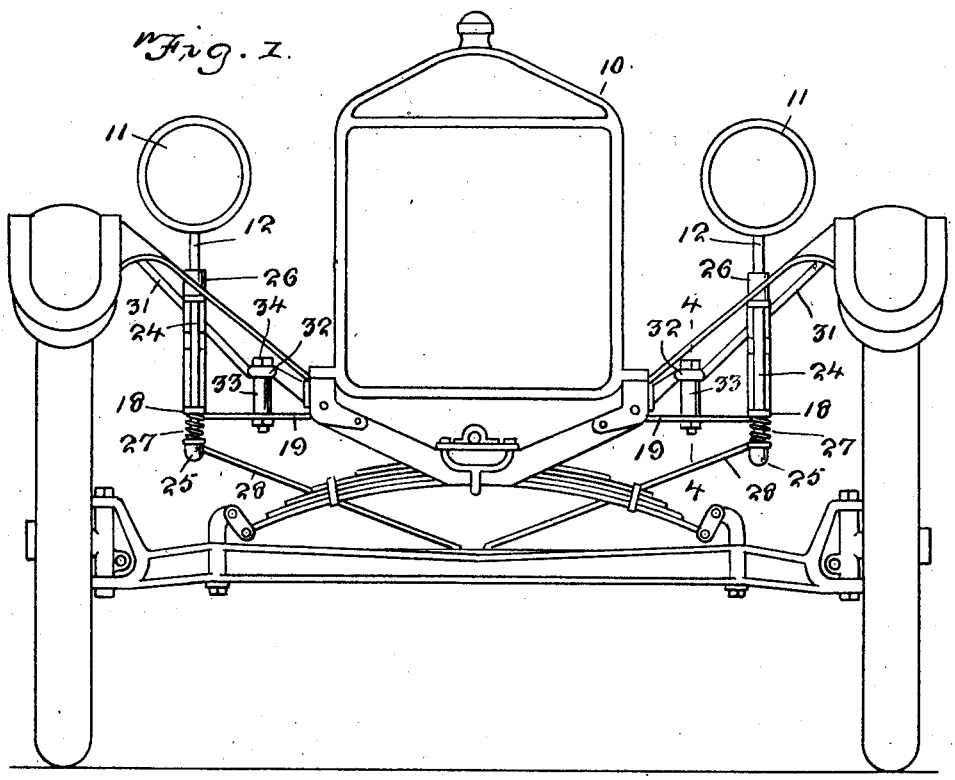
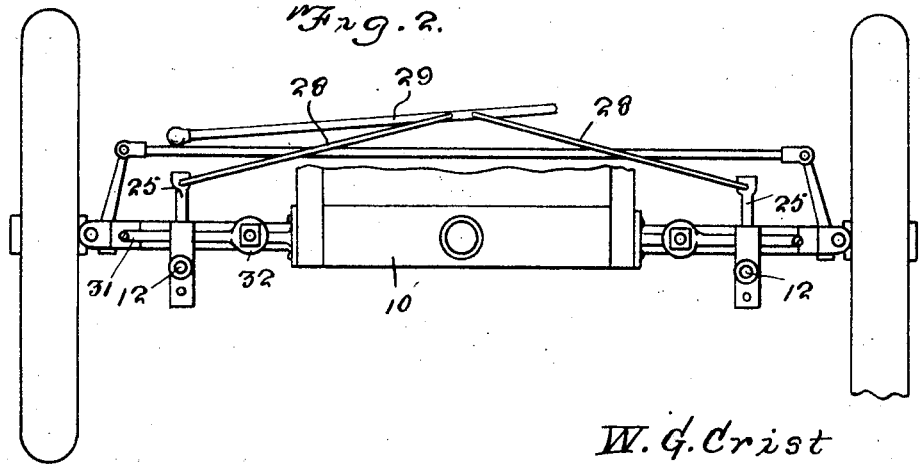

Jan. 22, 1929.
W. G. CRIST
1,700,028
AUTOMOBILE HEADLAMP MOUNTING
Filed June 4, 1927
3 Sheets-Sheet 2
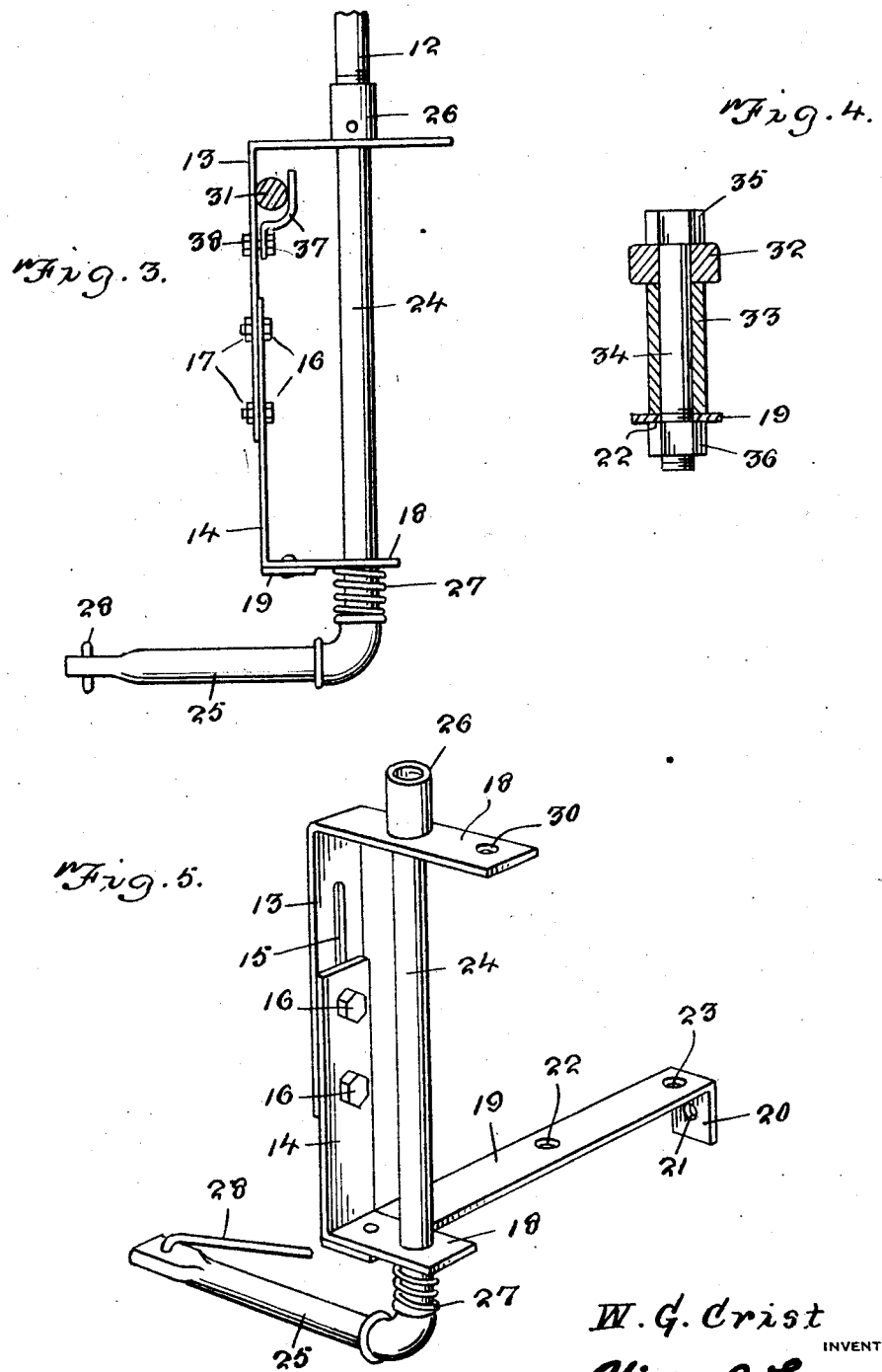

Jan. 22, 1929.　　　　　　　　　　　　　　　　　　1,700,028
W. G. CRIST
AUTOMOBILE HEADLAMP MOUNTING
Filed June 4, 1927　　　　　3 Sheets-Sheet 3
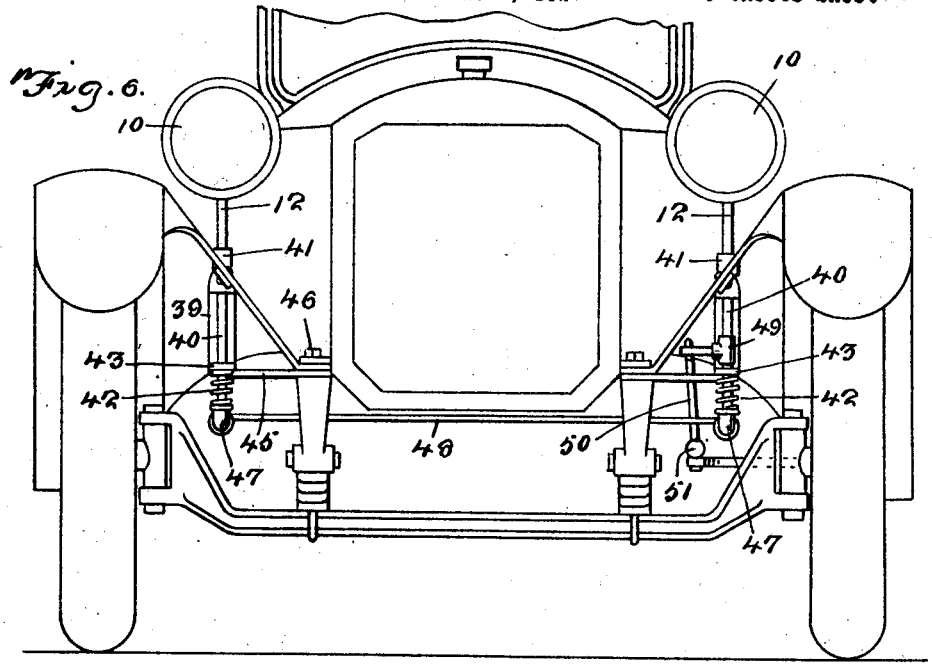
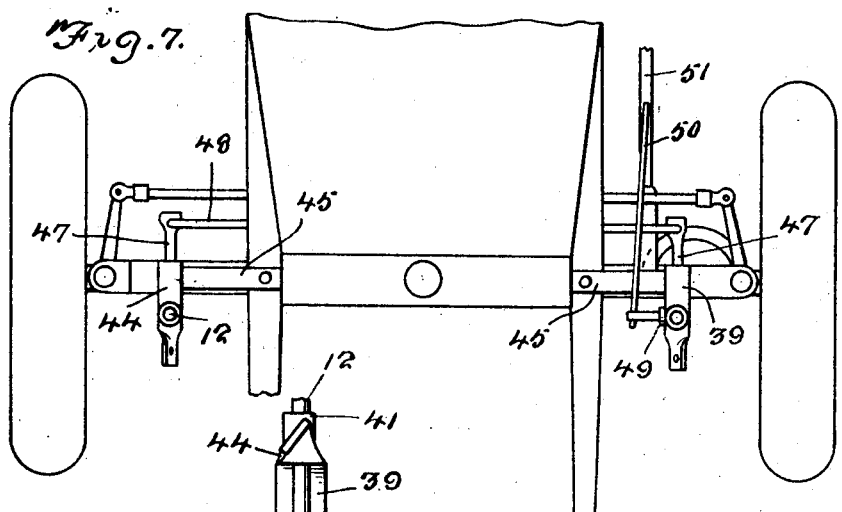
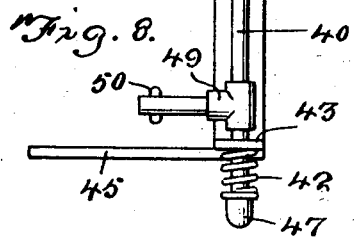
W. G. Crist
INVENTOR
BY Victor J. Evans
ATTORNEY Patented Jan. 22, 1929.

1,700,028

UNITED STATES PATENT OFFICE.

WILBUR G. CRIST, OF YELLOW PINE, ALABAMA.

AUTOMOBILE HEAD-LAMP MOUNTING.

Application filed June 4, 1927. Serial No. 196,544.

It is the object of the present invention to provide a novel construction of means for mounting the headlamps of a motor operated vehicle thereon, in a manner to permit rotation of said lamps in either direction, and operate said lamps incident to the steering of the vehicle, so that the light rays will always be maintained directly in advance of the course pursued by the machine.

The nature and advantages of the invention will be better understood when the following detail description is read in connection with the accompanying drawings, the invention residing in the construction, combination and arrangement of parts as claimed.

In the drawings forming part of this application like numerals of reference indicate similar parts in the several views and wherein:

Figure 1 is a front elevation of a motor vehicle showing the application of the invention.

Figure 2 is a fragmentary plan view showing how the headlamps are turned incident to the steering of the vehicle.

Figure 3 is a detail view of the bracket or mounting for one of the headlamps.

Figure 4 is a sectional view on line 4—4 of Figure 1.

Figure 5 is a perspective view of the bracket or mounting illustrated in Figure 3.

Figure 6 is a view similar to Figure 1 showing a slightly modified form of the invention.

Figure 7 is a fragmentary plan view showing how the lamps as mounted in Figure 6 are turned incident to the steering of the vehicle.

Figure 8 is a detail view of one of the lamp mountings.

Referring to the drawings in detail, and more particularly Figures 1 to 5 inclusive, 10 represents an automobile of the Ford type, and wherein 11 represents the headlamps, each of which is supported by a post or standard 12.

In accordance with the present invention I contemplate the use of an adjustable bracket for supporting the post 12 of each lamp, and connecting the latter with the steering mechanism for the purpose above outlined. The construction of these brackets is clearly illustrated in Figures 3 and 4, each bracket including relatively adjustable sections 13 and 14 respectively. These sections overlap, the section 13 being provided with a longitudinal slot 15 to accommodate bolts 16 carried by the section 14, and which bolts are provided with nuts 17 for holding the sections of the bracket fixed relatively in a given position. Each section is provided with a laterally disposed extremity 18, and while one is slightly longer than the other, the bracket in its entirety is substantially U-shaped as illustrated. Projecting at a right angle from the extremity 18 of the section 14 is a bracket arm 19 having a down turned end portion 20 provided with an opening 21. This arm 19 is also provided with a central opening 22 and an additional opening 23 arranged adjacent the outer end thereof.

Journaled in the upper and lower extensions 18 of the bracket is a shaft 24 provided with a horizontally disposed extension 25 adapted to be coupled in any suitable manner with the shaft 24. The upper end of the shaft 24 projects above the bracket and is provided with a threaded socket 26 in which the lower end of the adjacent lamp post 12 is adapted to be threaded. When the brackets are mounted upon the vehicle, in a manner to be hereinafter described, the lamps are supported against vibration by means of springs 27 which surround the lower portions of the shafts 24, being interposed between the adjacent extension 18 of the bracket and the coupling above referred to. The extensions 25 of the shafts 24 project rearwardly of the front axle of the machine and are connected by rods 28 with the adjacent rod 29 of the steering mechanism of the vehicle. Consequently when the rod 29 is called into use for the purpose of steering the vehicle, the shafts 24 are rotated to direct the light rays from the lamp in the direction pursued by the vehicle. In other words the shafts 24 and lamps 11 are turned in the same direction as the front wheels of the vehicle.

Each of the brackets above described is arranged beneath the apron of the adjacent fender, with the sockets of said brackets projecting through an opening in the apron as illustrated in Figure 1. The extension 18 of the section 13 is provided with an opening 30 so that this extension may be secured to said apron by a suitable fastening element. The bracket arm 19 extends in the direction of the frame of the vehicle and is secured thereto by suitable fastening elements adapted to be passed through the openings 21 and 23 illustrated in Figure 5. In order to steady the bracket, I make use of the fender brace 31 forming part of a Ford automobile structure, which brace is in the nature of a rod arranged beneath the fender apron and terminating to provide an eye 32. This eye is arranged directly above and in alignment with the opening 22 of the bracket arm 19, and I arrange between these parts a sleeve 33 adapted to receive a headed bolt 34 for connecting the parts together. The head 35 of the bolt reposes upon the eye 32, while the bolt passes through the opening 22 in the bracket arm, and is provided with an adjusting nut 36. The section 13 of the bracket is also provided with a clamp 37, secured to said bracket by a bolt and nut indicated generally at 38, the bracket being arranged and designed to embrace the rod 31 as clearly illustrated in Fig. 3.

In Figures 6 to 8 I have shown how the invention can be employed with cars of standard make, and which cars are not provided with bracing rods such as illustrated at 31 in Figure 1. The headlamps are indicated at 10 and the posts therefor at 12. The brackets which support the posts 12 are substantially the same as those hereinabove described, that is they are substantially U-shaped but formed from a single piece of material and indicated at 39. Each bracket has journaled thereon a shaft 40 similar to the shafts 24 hereinabove described, and each shaft is provided with a socket 41 projecting through an opening in the apron of the fender to receive and support the adjacent lamp post 12. A spring 42 surrounds the lower portion of the shaft 40 and bears against the adjacent limb 43 of the bracket to prevent rattling of the parts. The upper limb 44 is slightly twisted as shown in Figure 8 to lie parallel with the apron of the fender to which it is secured in any suitable manner. The bracket arm 45 projects at a right angle from the bracket and is secured to the frame of the vehicle by the same bolt 46 that retains the radiator in place.

In this form of the invention, the lateral extensions 47 of the shafts 40 are connected by a cross rod 48, so that the lamps will be operated in unison incident to the steering of the vehicle. One of the shafts 40 is provided with a T coupling 49, the stem of which is connected with the rod 50 associated with the shaft 51 of the steering mechanism. Consequently when the front wheels of the machine are turned in either direction, the head lamps are simultaneously turned in the same direction.

While it is believed that from the foregoing description, the nature and advantages of the invention will be readily apparent, I desire to have it understood, that I do not limit myself to what is herein shown and described and that such changes may be resorted to when desired as fall within the scope of what is claimed.

What is claimed is:

The combination with a pair of automobile headlamps, each including a post, of a pair of brackets mounted beneath the aprons of the front fenders of the machine, each bracket including overlapped slidable sections whereby the bracket can be varied in length to accommodate itself to a particular machine, the outer ends of the respective sections being offset parallel, a shaft journaled in the offset portions of each bracket and designed to receive and support the adjacent lamp post, a substantially flat bracket arm projecting from the lowermost offset portion of each bracket in the direction of the frame of the machine and having a central opening, the outer end of said arm being offset whereby said arm is attached to both the frame and fender apron, a fender brace rod extending in the direction of the frame and having a terminal eye arranged horizontally and in alignment with the opening of said bracket arm, a sleeve interposed between said opening and eye, a bolt passed through the eye, sleeve and arm and connecting said parts together to brace the bracket and prevent vibration thereof, and resilient means associated with each lamp shaft to prevent vibration of the latter in the bracket.

In testimony whereof I affix my signature.

WILBUR G. CRIST.